US010755212B2

(12) United States Patent
Dyer et al.

(10) Patent No.: US 10,755,212 B2
(45) Date of Patent: Aug. 25, 2020

(54) DYNAMIC PROCESS EXECUTION ARCHITECTURE WITH DISASSOCIATED RESOURCE CONTROL

(71) Applicant: Accenture Global Solutions Limited, Dublin (IE)

(72) Inventors: Taurean Dyer, San Jose, CA (US); Alex Kass, Palo Alto, CA (US); Manish Mehta, Milpitas, CA (US)

(73) Assignee: Accenture Global Solutions Limited, Dublin (IE)

( * ) Notice: Subject to any disclaimer, the term of this patent is extended or adjusted under 35 U.S.C. 154(b) by 254 days.

(21) Appl. No.: 15/435,690

(22) Filed: Feb. 17, 2017

(65) Prior Publication Data

US 2017/0244646 A1 Aug. 24, 2017

Related U.S. Application Data

(60) Provisional application No. 62/297,473, filed on Feb. 19, 2016.

(51) Int. Cl.
| | |
|---|---|
| *G06Q 10/06* | (2012.01) |
| *G06F 40/174* | (2020.01) |
| *G06F 40/186* | (2020.01) |
| *H04L 12/911* | (2013.01) |
| *H04L 29/08* | (2006.01) |

(52) U.S. Cl.
CPC ... *G06Q 10/063118* (2013.01); *G06F 40/174* (2020.01); *G06F 40/186* (2020.01); *G06Q 10/063112* (2013.01); *H04L 47/70* (2013.01); *H04L 67/10* (2013.01); *H04L 67/26* (2013.01)

(58) Field of Classification Search
None
See application file for complete search history.

(56) References Cited

U.S. PATENT DOCUMENTS

| | | | |
|---|---|---|---|
| 5,832,483 A | 11/1998 | Barker | |
| 6,006,195 A * | 12/1999 | Marchak | G06Q 10/04 705/7.15 |
| 6,480,863 B1 | 11/2002 | Scheifler et al. | |
| 6,988,140 B2 | 1/2006 | Chintalapati et al. | |
| 7,222,330 B2 | 5/2007 | Bicknell et al. | |
| 7,499,899 B2 | 3/2009 | Siegel et al. | |
| 7,584,302 B1 | 9/2009 | Pg et al. | |
| 7,593,946 B2 | 9/2009 | Toomey | |
| 2002/0029161 A1 | 3/2002 | Brodersen et al. | |

(Continued)

OTHER PUBLICATIONS

Australian Examination Report No. 1 for Australian Patent Appln. No. 2017201108 dated Sep. 9, 2017, 6 pages.
Australian Examination Report No. 1 for Australian Patent Appln. No. 2017201109 dated Aug. 24, 2017, 5 pages.
Edward J. Barkmeyer et al., "Concepts for Automating Systems Integration", National Institute of Standards and Technology, Technology Administration, U.S. Department of Commerce, Feb. 2003, 90 pages.

(Continued)

*Primary Examiner* — Kevin T Bates
*Assistant Examiner* — Dae Kim
(74) *Attorney, Agent, or Firm* — Brinks Gilson & Lione

(57) ABSTRACT

The global proliferation of high speed communication networks has created unprecedented opportunities for geographically distributed resource interaction. However, while the opportunities exist and continue to grow, the realization of those opportunities has fallen behind. A dynamic process execution architecture solves the enormous technical challenges of providing effective and efficient process execution environments for geographically distributed resources to execute a complex project.

16 Claims, 14 Drawing Sheets

(56) References Cited

U.S. PATENT DOCUMENTS

| | | | |
|---|---|---|---|
| 2002/0184071 A1 | 12/2002 | Bicknell et al. | |
| 2004/0019603 A1* | 1/2004 | Haigh | G06Q 10/109 |
| 2007/0299795 A1* | 12/2007 | Macbeth | G06Q 10/10 706/16 |
| 2009/0271762 A1* | 10/2009 | Taylor | G06F 21/6227 717/107 |
| 2009/0307042 A1 | 12/2009 | Sunagawa | |
| 2010/0235505 A1* | 9/2010 | Gupta | G06Q 10/107 709/225 |
| 2013/0086079 A1 | 4/2013 | Chaudhuri et al. | |
| 2014/0222712 A1 | 8/2014 | Samaha et al. | |
| 2014/0223342 A1 | 8/2014 | Hood et al. | |
| 2014/0278638 A1* | 9/2014 | Kreuzkamp | G06Q 10/06398 705/7.15 |
| 2014/0279832 A1* | 9/2014 | Vivalda | G06F 16/283 707/602 |
| 2014/0365511 A1* | 12/2014 | Burrows | G06F 17/30867 707/754 |
| 2017/0103360 A1 | 4/2017 | Ristock et al. | |
| 2017/0193349 A1* | 7/2017 | Jothilingam | G06N 3/006 |

OTHER PUBLICATIONS

Examination Report No. 3 in Australia Patent Application No. 2017201108 dated Jul. 19, 2018, pp. 1-4.

Australia Patent Office, Examination Report No. 2 for Australia Patent Application No. 2017201108 dated Jan. 30, 2018, pp. 1-3.

Examination Report No. 4 for Australian Application No. 2017201108, dated Sep. 6, 2018, pp. 1-4.

Final Office Action and Notice of References for U.S. Appl. No. 15/435,716, dated Mar. 17, 2020, 30 pages.

Australian Examination Report No. 1, dated Oct. 30, 2019, pp. 1-3, issued in Australian Patent Application 2018226460, Offices of IP Australia, Woden, ACT, Australia.

U.S. Office Action, dated Jun. 25, 2019, pp. 1-41, issued in U.S. Appl. No. 15/435,716, U.S. Patent and Trademark Office, Alexandria, VA.

Examination Report No. 2 issued in Australian Application No. 2018226460 dated Apr. 3, 2020, 2 pages.

* cited by examiner

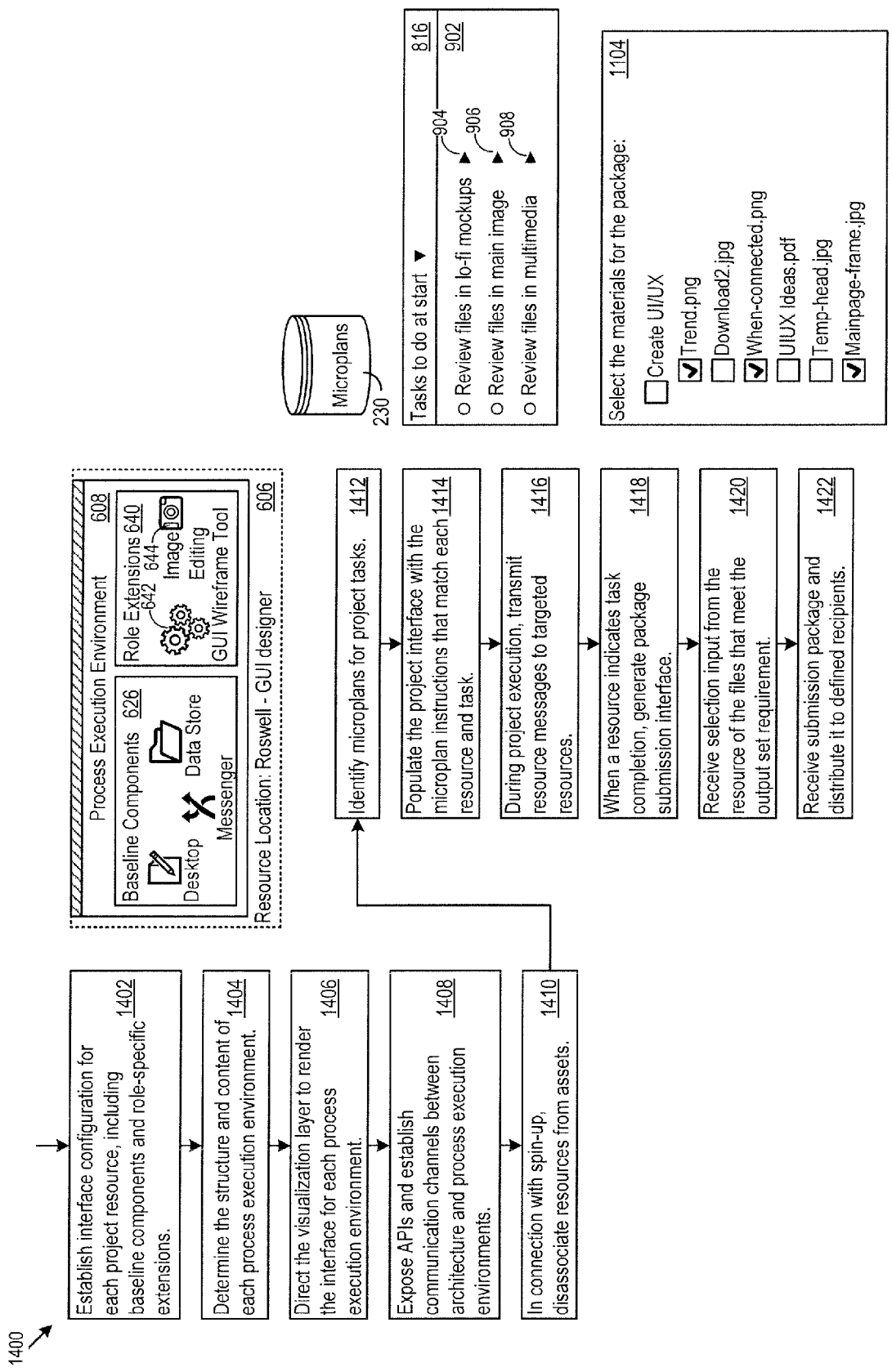

DYNAMIC PROCESS EXECUTION ARCHITECTURE WITH DISASSOCIATED RESOURCE CONTROL

PRIORITY CLAIM

This application claims priority to U.S. provisional application Ser. No. 62/297,473, filed 19 Feb. 2016, which is entirely incorporated herein by reference.

TECHNICAL FIELD

This application relates to communication with and control over geographically distributed resources that contribute to execution of a complex project.

BACKGROUND

The global proliferation of high speed communication networks has created unprecedented opportunities for geographically distributed resource interaction. However, while the opportunities exist and continue to grow, the realization of those opportunities has fallen behind. In part, this is due to the enormous technical challenges of effectively connecting the geographically distributed resources in an effective operational environment that allows the resources to efficiently function together to accomplish a complex project.

BRIEF DESCRIPTION OF THE DRAWINGS

FIG. 14 shows logic that the architecture may implement.

DETAILED DESCRIPTION

Effectively providing an efficient collaborative environment that permits geographically disbursed resources to interact efficiently to successfully accomplish complex projects is a significant technical challenge. The dynamic process execution architecture described below provides technical solutions to establishing and controlling such a collaborative process execution environment. One beneficial result is that complex projects may be carried out in a far more flexible manner, by relying on resources that no longer need close physical proximity or common communication protocols.

Figure 1:
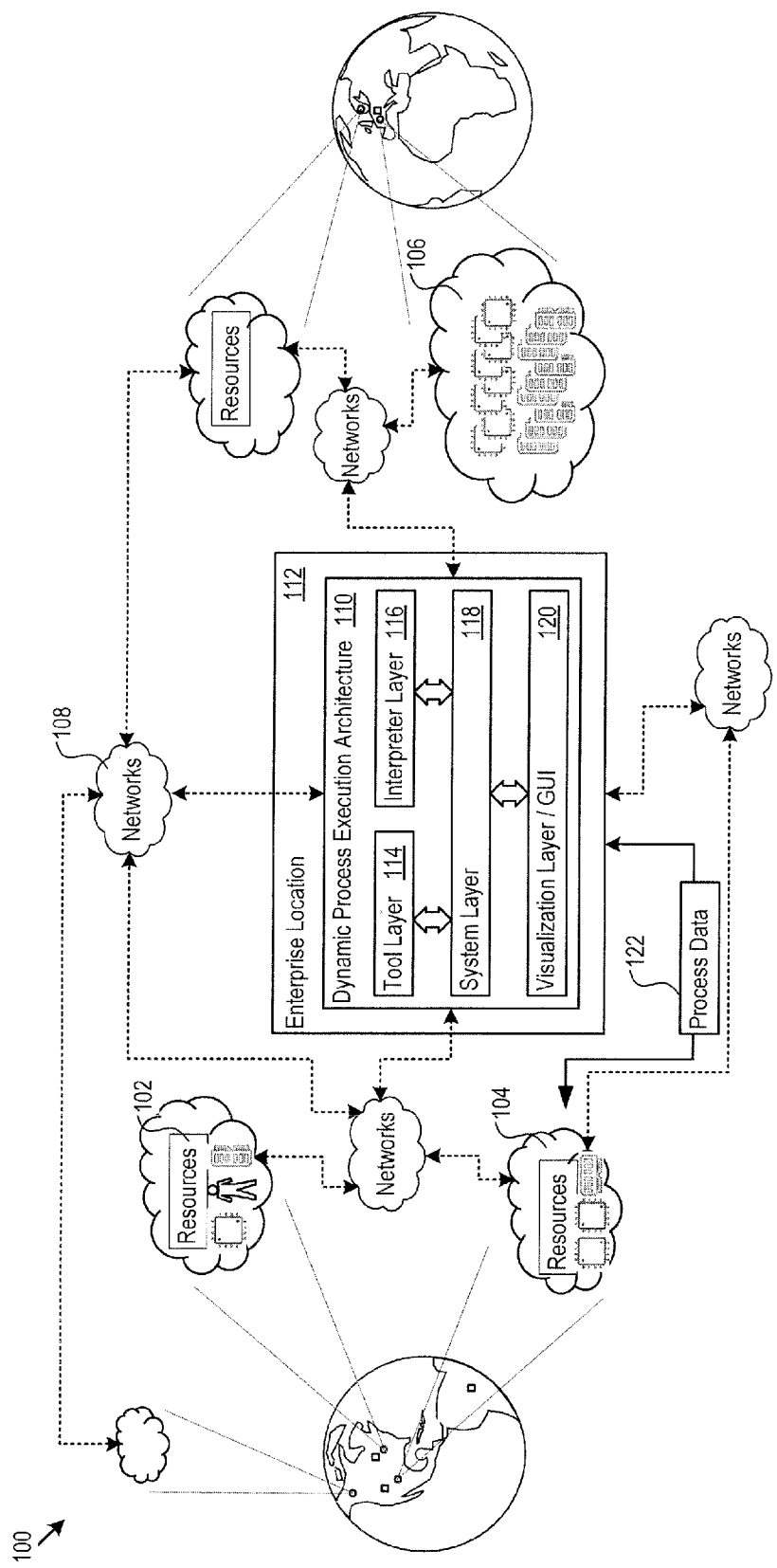
FIG. 1 shows an example of a global network architecture.
Figure 2:
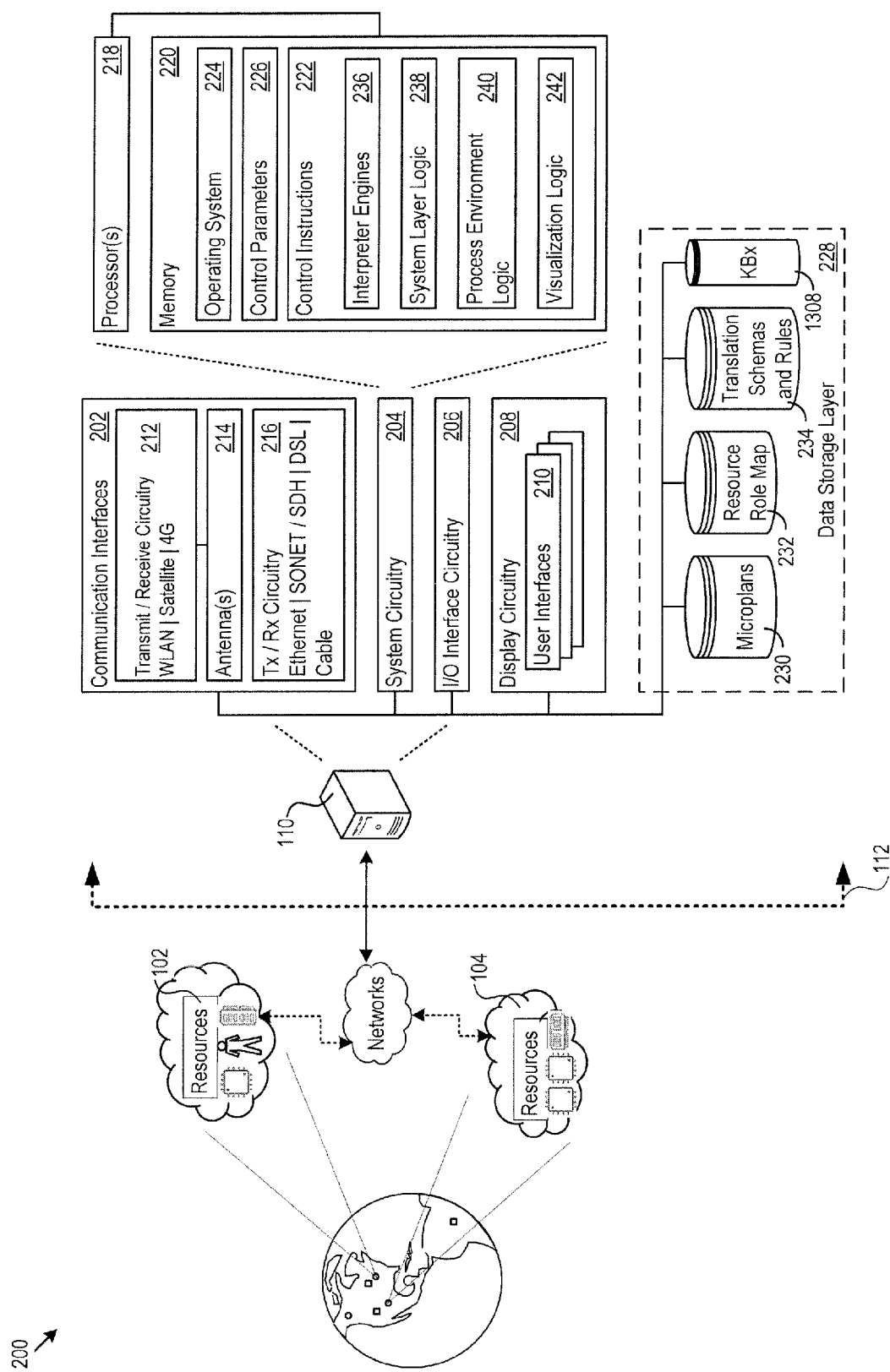
FIG. 2 illustrates an example implementation of a virtualization architecture.

FIGS. 1 and 2 provide an example context for the discussion below of the technical solutions in the dynamic process execution architecture. The examples in FIGS. 1 and 2 show one of many possible different implementation contexts. In that respect, the technical solutions are not limited in their application to the architectures and systems shown in FIGS. 1 and 2, but are applicable to many other system implementations, architectures, and connectivity.

FIG. 1 shows a global network architecture 100. Connected through the global network architecture 100 are resources, e.g., the resources 102, 106, and 106. These resources may be present at many different resource sites globally, and for certain types of resources (e.g., virtualized computing resources) the resource sites are service providers that host the resources. The resource sites and resources may be located in any geographic region, e.g., United States (US) East, US West, or Central Europe. Resources may correspond to any element of project execution, whether specific individuals (e.g., a GUI programmer), hardware resources (e.g., CPU, memory and disk resources), or software resources (e.g., algorithm or function packages, application software, operating systems, or database management systems). In addition, any of the resources and resource sites may provide resource descriptors for the resources. The resource descriptors may include data that characterizes, defines, or describes the resources. A few examples of resource descriptors include data specifying abilities, speed, reliability, location, availability, languages, cost, capability, capacity, experience, skill descriptors, historical performance data, and execution capability data. Further, resources and resource descriptors may also be present locally within an enterprise that seeks to carry out a project, in addition to being geographically distributed.

Throughout the global network architecture 100 are networks, e.g., the network 108. The networks provide connectivity between the resources, resource descriptors, service providers, enterprises, and other globally positioned entities. The networks 108 may include private and public networks defined over any pre-determined and possibly dynamic internet protocol (IP) address ranges.

A dynamic process execution architecture ("architecture") 110 is hosted at an enterprise location 112. The enterprise location 112 acts as a centralized control point over the processes needed to be executed to carry out a complex project using the geographically distributed resources. The complex project may be one that the enterprise itself needs to accomplish, though in other instances the enterprise location 112 may provide centralized control over complex projects for third parties.

In the example shown in FIG. 1, the architecture 110 includes a tool layer 114 and an interpreter layer 116. A system layer 118 coordinates the operation and interactions among the tool layer 14 and the interpreter layer 116. In addition, the system layer 118 drives a visualization layer 120 that renders or outputs, for instance, a set of graphical user interfaces (GUIs) that facilitate process execution among the resources, e.g. in HTML form or as video signals for driving displays.

The resources, resource sites and the enterprise location 112 exchange process data 122. Examples of process data 122 include process plans and process microplans; tool commands, instructions, and tool objects (such as tool input/output, e.g., HTML files, image files, sound files, source code files, and the like); messages, such as microplan task completion messages; visualizations, such as plan and microplan review, editing, and completion GUIs, object package GUIs, and messaging interface GUIs. The process data 122 may vary widely depending on the implementation of the architecture 110 and the particular process that drives work on the project.

FIG. 2 shows an example implementation of the architecture 110. The architecture 110 includes communication interfaces 202, system circuitry 204, input/output (I/O) interface circuitry 206, and display circuitry 208. The visualization layer 120 generates the GUIs 210 locally using the display circuitry 208, or for remote visualization, e.g., as HTML, JavaScript, audio, and video output for a web browser running on a local or remote machine. Among other interface features, the GUIs 210 may render interfaces for task microplanning, inter-resource communication, exchange of object packages for review and for subsequent process stages, execution of tools in a dynamic workspace, and other features.

The GUIs 210 and the I/O interface circuitry 206 may include touch sensitive displays, voice or facial recognition inputs, buttons, switches, speakers and other user interface elements. Additional examples of the I/O interface circuitry 206 includes microphones, video and still image cameras, headset and microphone input/output jacks, Universal Serial Bus (USB) connectors, memory card slots, and other types of inputs. The I/O interface circuitry 206 may further include magnetic or optical media interfaces (e.g., a CDROM or DVD drive), serial and parallel bus interfaces, and keyboard and mouse interfaces.

The communication interfaces 202 may include wireless transmitters and receivers ("transceivers") 212 and any antennas 214 used by the transmit and receive circuitry of the transceivers 212. The transceivers 212 and antennas 214 may support WiFi network communications, for instance, under any version of IEEE 802.11, e.g., 802.11n or 802.11ac. The communication interfaces 202 may also include wireline transceivers 216. The wireline transceivers 216 may provide physical layer interfaces for any of a wide range of communication protocols, such as any type of Ethernet, data over cable service interface specification (DOCSIS), digital subscriber line (DSL), Synchronous Optical Network (SONET), or other protocol.

The system circuitry 204 may include any combination of hardware, software, firmware, or other circuitry. The system circuitry 204 may be implemented, for example, with one or more systems on a chip (SoC), application specific integrated circuits (ASIC), microprocessors, discrete analog and digital circuits, and other circuitry. The system circuitry 204 may implement any desired functionality in the architecture 110, including the interpreter layer 116, the system layer 118, and the visualization layer 120. As just one example, the system circuitry 204 may include one or more instruction processors 218 and memories 220. The memories 220 store, for example, control instructions 222 and an operating system 224. In one implementation, the processor 218 executes the control instructions 222 and the operating system 224 to carry out any desired functionality for the architecture 110, including the functionality described below for the including the tool layer 114, interpreter layer 116, the system layer 118, and the visualization layer 120. The control parameters 226 provide and specify configuration and operating options for the control instructions 222, operating system 224, and other functionality of the architecture 110.

The architecture 110 may include a data storage layer 228 that hosts any number of local data repositories. In the example shown in FIG. 2, the data storage layer 228 includes a microplan database 230, a resource role mapping database 232, and a translation schemas and translation database 234. As will be discussed below, microplans may be manually generated on a per-project basis, e.g., from a higher level project plan, but they may also be determined automatically, e.g., via a machine learning analysis on prior projects. Any previously determined microplans may reside in the microplan database 230 for re-use on future projects. As will also be discussed further below, the resource role mapping database 232 may store records that link specific resource roles for the resources to specific process execution environments for that role. For instance, a GUI developer role may map to a process execution environment including a desktop view, a messaging application, a CAD application, and a photo editing application, while a C++ developer role may map to a process execution environment including a desktop view, a messaging application, a C++ compiler and debugger, and a C++ code text editor. While the data storage layer 228 is shown local to the enterprise, the architecture 110 may connect to any network entity to access and exchange other sources of microplans, resource mappings, or any other data that facilitates control of the process execution environment.

The control instructions 222 drive the functionality of the architecture 110. Described in more detail below, the control instructions 222 may implement interpreter engines 236 responsive to the translation schemas and rules in the translation database 234. The interpreter engines 236 may convert back and forth between tool-specific data elements described by tool-specific schemas and a normalized form (described, e.g., by a system schema) that the system layer logic 238 uses as it coordinates process execution among multiple tools, resources, and microplans. The process environment logic 240 dynamically specifies, builds, and tears-down process execution environments through which selected resources collaborate to complete projects. The visualization logic 242 generates the GUIs 210 to provide interfaces for task microplanning, inter-resource communication, exchange of object packages for review and for subsequent process stages, execution of tools in a dynamic workspace, and other features.

The data storage layer 228, interpreter engines 236, system layer logic 238, process environment logic 240, and visualization logic 242, as well as the structure and content of the generated GUIs improve the functioning of the underlying computer hardware itself. That is, these features (among others described below) are specific improvements in way that the underlying computer system operates. The improvements facilitate more efficient, accurate, consistent, and precise execution of complex projects using disparate geographically distributed resources. The improved functioning of the underlying computer hardware itself achieves further technical benefits. For example, the architecture 110 avoids lack of automation, reduces manual intervention, reduces the possibility for human error, and therefore increases task completion efficiency and reduces wait times for correct completion of complex projects.

Tool Layer

Figure 3:
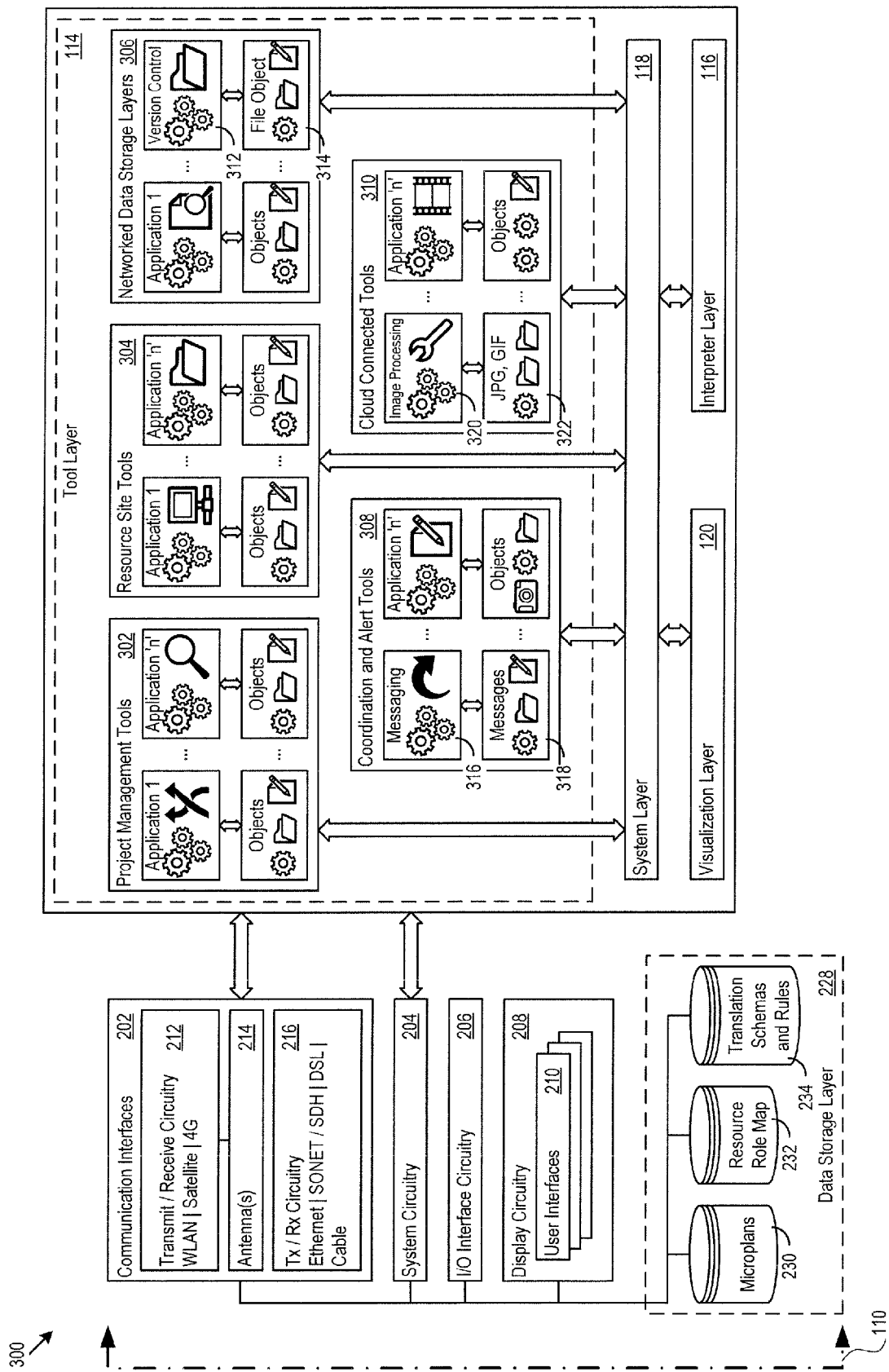
FIG. 3 shows one example of architectural components that may implement the tool layer in the architecture.

FIG. 3 shows one example of architectural components 300 that may implement the tool layer 114 in the architecture 110. The particular implementation of the tool layer 114 may vary widely depending on the desired functionalities coordinated by the architecture 110. For instance, an architecture 110 focused on application code writing may coordinate source code repository tools, text editing tools, debugger tools, collaborative messaging tools, virtual desktops, and the like. On the other hand, an architecture 110 focused on advertising projects may coordinate collaborative messaging tools, virtual desktops, photo, sound, and video recording and editing tools, and multimedia playback tools. In the example in FIG. 3, the tool layer 114 defines multiple tool categories, including project management tools 302, resource site tools 304, networked data storage layers 306, coordination and alert tools 308, and cloud connected tools 310. The specific tools in any particular category provide specific functionalities that connected resources employ to accomplish their project, under central control by the architecture 110.

The tools send and receive messages through the architecture 110. In addition, the tools operate on specific tool objects in the normal course of operation of the tool. For instance, the networked data storage layers 306 may include a version control tool 312 that operate on source code file objects 314 that the version control tool saves and retrieves responsive to commands from resources working on those objects. As another example, the coordination and alert tools 308 may include a messaging application 316 that operates on message objects 318, e.g., to send and receive microplan update messages between resources. A further example is, in the cloud connected tools 310, an image processing application 320 that operates on image files, such as JPG, GIF, and TIFF files.

Additional examples of tools that may be included in each of the tool categories is provided below in Table 1.

TABLE 1

| Category | Example Tools |
| --- | --- |
| project management tools | Foundry, Trello, Basecamp, MS Project |
| resource site tools | Upwork, Freelancer |
| networked data storage layers | OneDrive, Sharepoint, Google Drive, Dropbox |
| coordination and alert tools | Slack, Google Hangouts, Yammer, Skype |
| cloud connected tools | GitHub, Cloud 9, Office 365, Adobe Creative Cloud |

The tool layer 114 exists across the boundary between the architecture 110 itself, and (potentially remote) resource sites. In that respect, specific tools in the tool layer 114, such as the image processing application 320, may be hosted and executed at remote resource sites and be in communication with the architecture 110 via the communication interfaces 202. In addition, any of the tools may be hosted and executed within the architecture 110 itself. At the same time, messages and objects that the tools operate on pass in and out of the architecture 110 through the communication interface 202. In particular, the messages and objects pass through the system layer 118, interpreter layer 116, and the visualization layer 120 in several different manners and contexts described below.

The architecture 110, through connectors in the system layer 118 (and communication interfaces 202 for externally hosted tools), exchanges messages and objects with the tools in the tool layer 114. The connectors may be implemented as web data connectors (WDC), for instance, configured to read data from virtually any resource site that provides data in JSON, XML, HTML, or other formats. That is, the architecture 110 in place at any given enterprise location may communicate with local and remote tools, resource sites, and geographically distributed resources to exchange project messages and project objects in connection with coordination and control over a complex project.

Interpreter Layer

Figure 4:
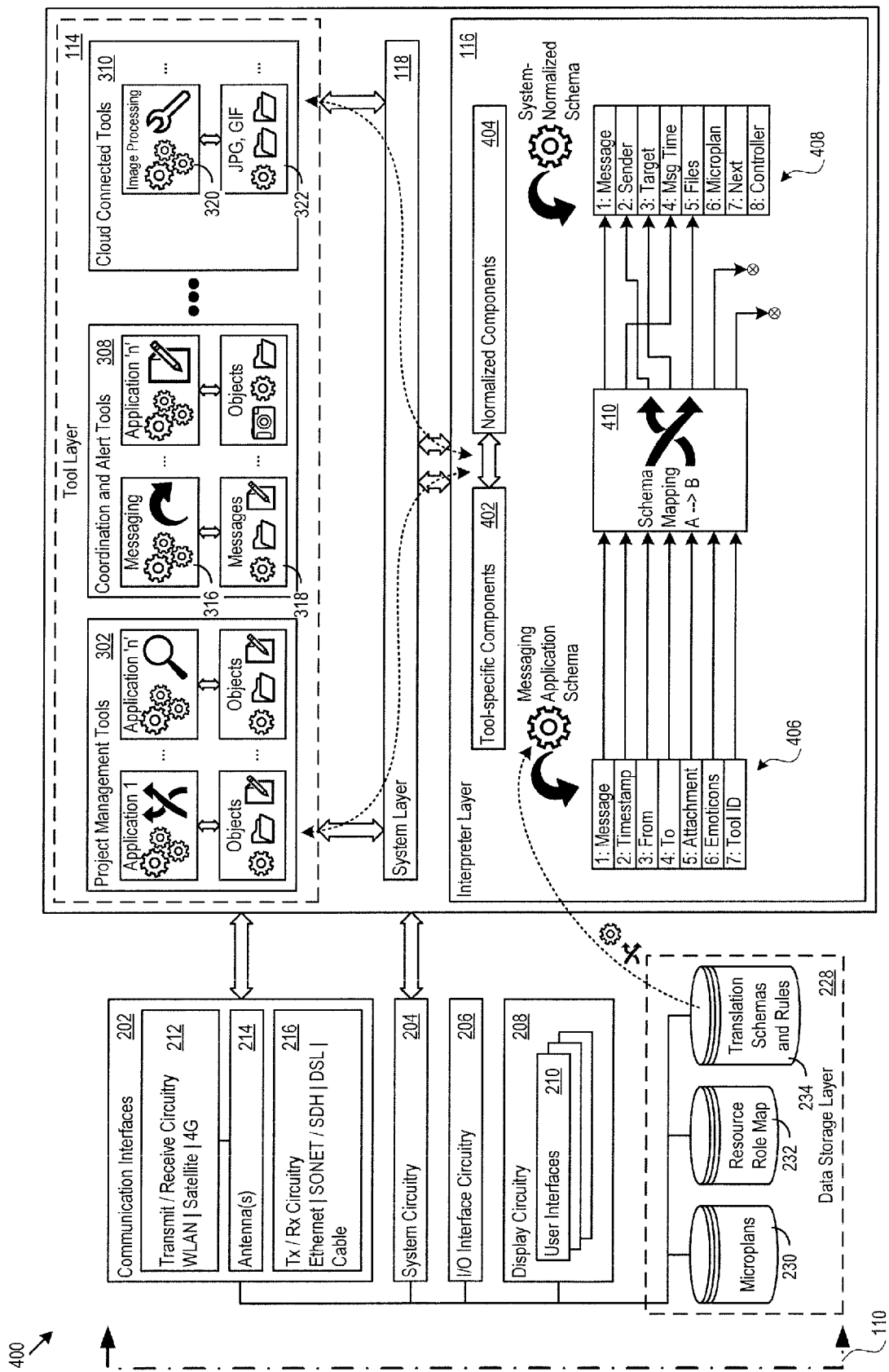
FIG. 4 shows an example implementation of the interpreter layer.

FIG. 4 shows an example implementation of the interpreter layer 116. The interpreter layer 116 converts tool-specific data components 402 to system-normalized data components 404. The system layer 118 internally coordinates project execution on the basis of the system-normalized data components 404. Several aspects of the internal coordination are described below with regard to the system layer 118 and visualization layer 120. The architecture 110 may, for instance, expose system APIs through which the tools communicate with the architecture 110. Similarly, the tools expose their own set of tool APIs through which the architecture 110 may communicate with the tools. When project objects, messages, or other data components need to pass to the tools in the tool layer 114, the interpreter layer 116 performs a conversion from the system-normalized data components 404 to the tool-specific components 402. After conversion, the system layer 118 passes the tool-specific components 402 back to the target tool in the tool layer 114.

One technical benefit is that the tools in the tool layer 114 continue to operate in their own proprietary manners using their own proprietary data components. At the same time, the system layer 118 is able to act as a central coordination point for the disparate tools by working with the system-normalized data components 404. The interpreter layer 116 may be extended to perform the translation for as many different tools as the architecture 110 will coordinate among the resources assigned to a given project.

In one implementation, the interpreter layer 116 receives a tool-specific schema and the system-normalized schema from the translation database 234, along with schema mapping rules from the tool-specific schema to the system-normalized schema. The interpreter layer 116 then translates the tool-specific components in the communication from the particular tool to system-normalized components defined in the system-normalized schema, as directed by the mapping rules. The tool-specific schemas may, for instance, identify the individual data components in a message or project object received from a specific tool. The mapping rules may then dictate how a given data component maps to the system-normalized schema, including any data transformation needed to execute on the data component as part of the mapping. The translation database 234 may include schemas and mapping rules for any number of tools in the tool layer 115.

In the example translation 400 shown in FIG. 4, the messaging application schema 406 identifies that messages from the messaging application include seven data components: 1) message text, 2) a timestamp, 3) the From: entity identifier, 4) the To: entity identifier, 5) file attachments, 6) emoticons, and 7) a tool identifier. In this particular example, the system-normalized schema 408 identifies system-normalized messages as including 8 data components: 1) a message, 2) the sender, 3) the target, 4) the message time, 5) file attachments, 6) the microplan step associated with the message, 7) the next resource who needs to act after this microplan step, and 8) an identification of project controller or supervisor. The schema mapping 410 includes rules that dictate which tool-specific data components map to which system-normalized data components, as a few examples: the Message field from the messaging application is placed directly into the Message field for the system-normalized message, the From field is mapped to the Sender field, and the Emoticons and Tool ID fields are dropped.

When the system layer 118 will communicate to a specific tool, such as the messaging application 316, the interpreter layer 116 constructs a tool-specific message with tool-specific data components from a system-normalized message with system-normalized message components. In that respect, the translation database 234 may store inverse schema mappings that direct how the interpreter layer 116 will construct the tool-specific message. That is, the translation database 228 may store inbound schema mappings and outbound schema mappings that dictate data element translation of incoming data elements and outgoing data elements, respectively.

Figure 5:
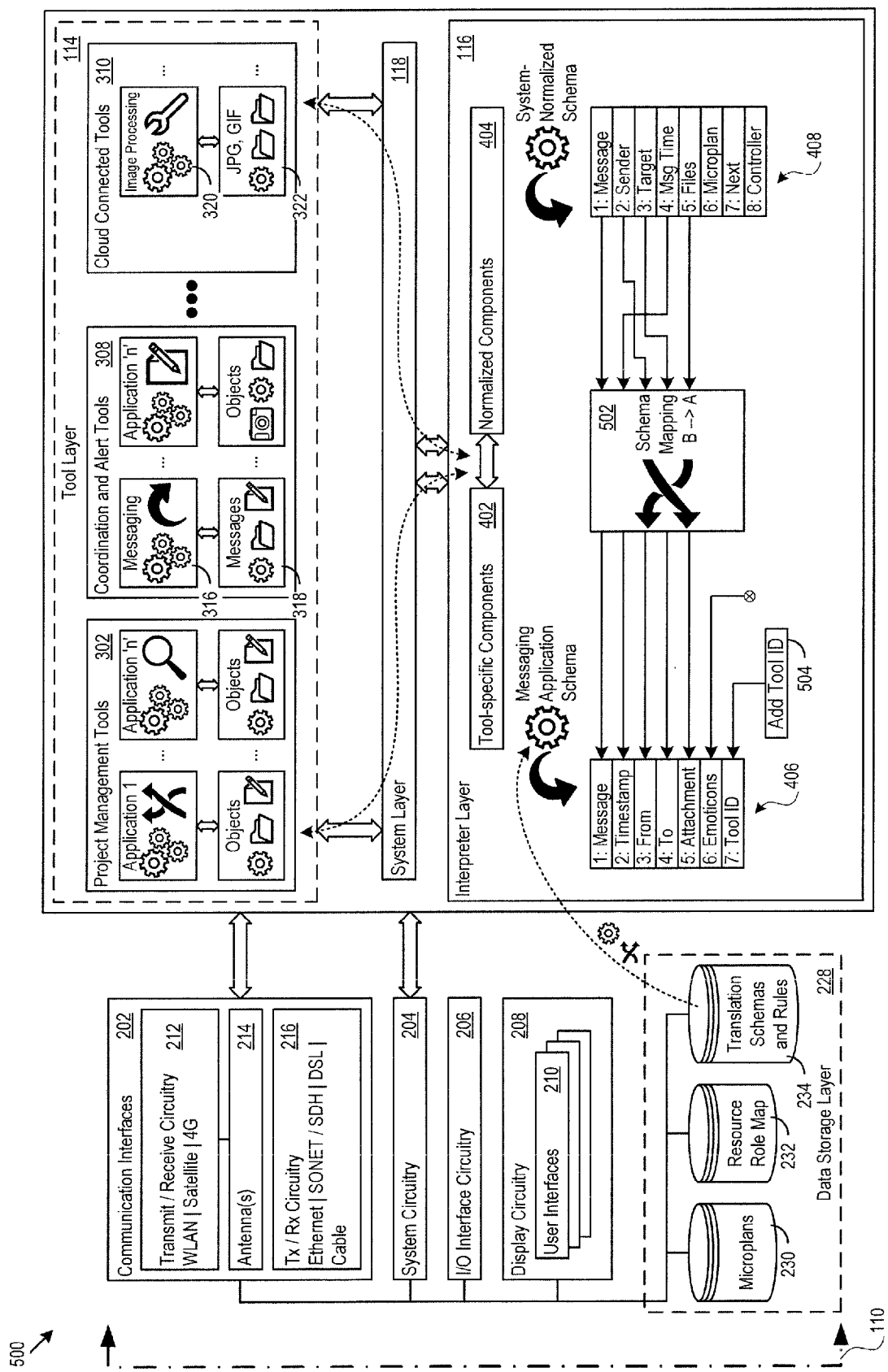
FIG. 5 shows an example of the translation from the system-normalized schema to the tool-specific schema.

FIG. 5 shows an example of the translation 500 from the system-normalized schema 408 to the tool-specific schema 406 for the messaging application 316. The schema mapping 502 provides the data component mapping rules. For instance, in this example, the schema mapping 502 directs the interpreter layer 116 to save the system Message field into the tool-specific Message field, and to map the system Sender field to the tool-specific From field. No emoticon data components are added, but the schema mapping 502 may direct the interpreter layer 116 to add the appropriate tool identifier 504 to the tool-specific Tool ID field, according to the tool with which the system layer 118 is going to communicate.

System Layer and Visualization Layer

Figure 6:
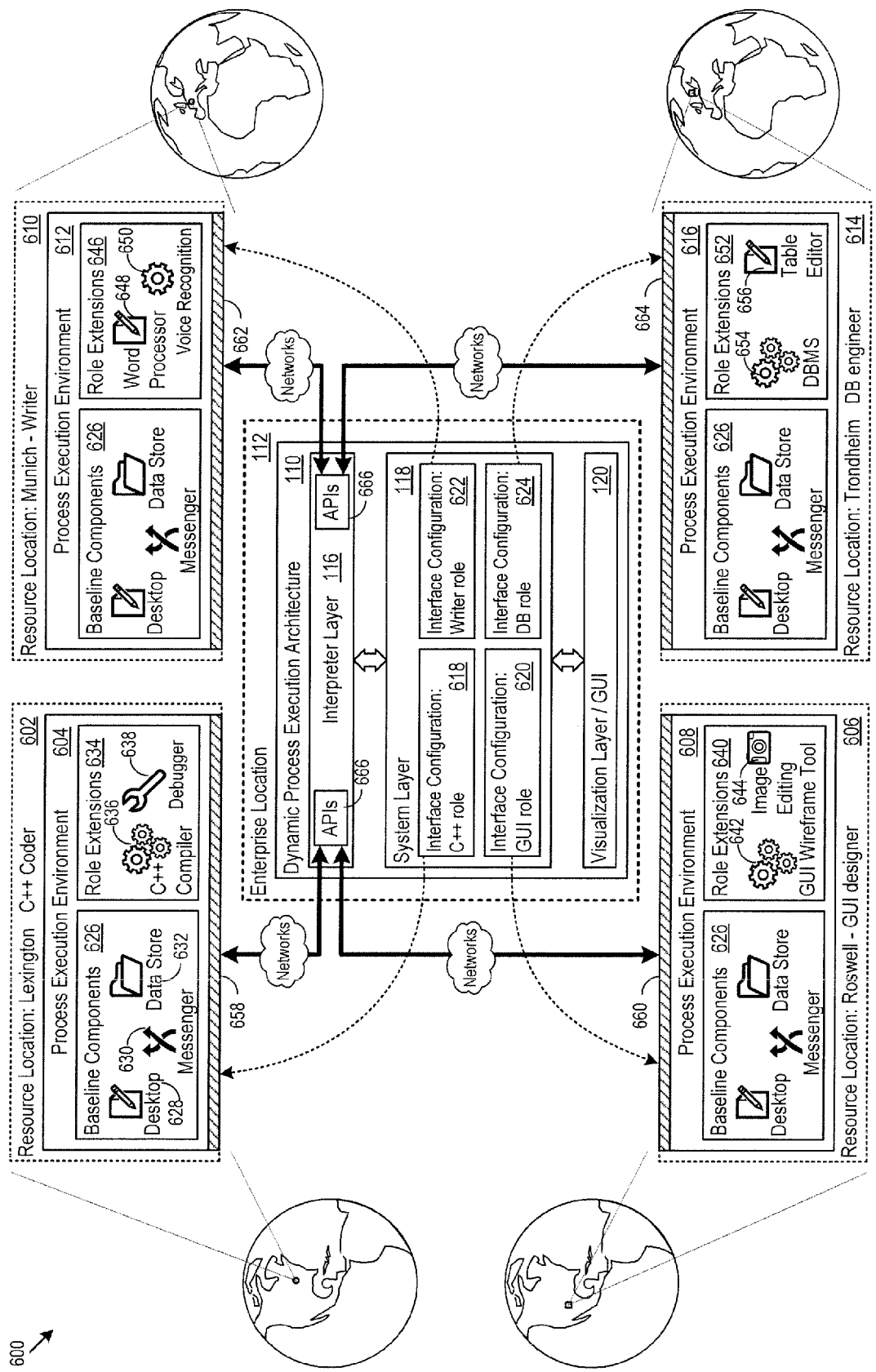
FIG. 6 shows example resource interfaces.

FIG. 6 shows example resource interfaces 600 for geographically distributed resources. There may be any number of different resources and any number of different resource interfaces. In this example, the C++ resource 602 is a C++ coder located in Lexington Ky., working through a role-tailored process execution environment 604. The GUI resource 606 is a GUI designer located in Roswell, N. Mex., working through a role-tailored process execution environment 608. The writer resource 610 is a documentation writer located in Munich, Germany, working through a role-tailored process execution environment 612. The DB resource 614 is a database engineer located in Trondheim, Norway, working through a role-tailored process execution environment 616.

The system layer 118 determines the structure and content of each process execution environment, and directs the visualization layer 120 to render the interface for each process execution environment for each resource. In one implementation, the system layer 118 establishes an interface configuration for each resource, e.g., the interface configurations 618 for the C++ resource 602, the interface configuration 620 for the GUI resource 606, the interface configuration 622 for the writer resource 610, and an interface configuration 624 for the DB resource 614. Each interface configuration may include baseline components and role-specific extensions.

The baseline components are the project collaboration components provisioned for each process execution environment. These may vary according to the particular project, and typically represent a core set of functionality that each resource needs to interact with other resources and to accomplish their role. In the example shown in FIG. 6, each resource and each process execution environment has a common set of baseline components 626. The baseline components 626 include a virtual desktop 628, a messenger client 630, and a data storage interface 632, e.g., to save and retrieve project objects into cloud storage.

The baseline and role extension components may be specified by software and hardware identifiers in the interface configurations for assets that are spun-up, provisioned, or instantiated for each resource. For instance, the virtual desktop 628 may arise from a virtual machine (VM) running a particular operating system (OS), the messenger client 630 may result from installing a messaging application via the OS, and the data storage interface 632 may arise from installing a cloud storage application via the OS. VMs, VM components, and baseline components, and role extension components maybe hosted on premises at the enterprise location 112, or at one or more public cloud providers.

Each interface configuration also specifies role-specific extensions for the process execution environments. In FIG. 6, interface configuration 618 establishes the role-specific extensions 634 for the process execution environment 604 for the C++ resource 602, namely a C++ compiler 636 and a debugger 638. The interface configuration 620 establishes the role-specific extensions 640 for the process execution environment 608 for the GUI resource 606, namely a GUI wireframe tool 642 and an image editor 644. The interface configuration 622 establishes the role-specific extensions 646 for the process execution environment 612 for the writer resource 610, namely a word processor 648 and a voice recognition application 650. The interface configuration 624 establishes the role-specific extensions 652 for the process execution environment 616 for the DB resource 614, namely a DBMS 654 and a visual table editor 656.

It was mentioned above that the architecture 110 may include APIs through which resources communicate with the architecture 110. FIG. 6 shows that each process execution environment may have its own set of APIs, e.g., the APIs 658, 660, 662, and 664, through which the process execution environments communicate with the APIs 666 in the architecture 110.

In some implementations and for some resources, the architecture 110 may configure any of the resources as a disassociated resource. In that regard, the architecture 110 may provide (for instance) tokenized access to tool credentials, to separate ownership of the tool data from the resource itself. As a result, as resources join and leave, the underlying accounts remain, but resources gain or lose access to the underlying account. Expressed another way, the disassociated resource may join and leave the project without causing creation of a new underlying account or deletion of the existing underlying account, thereby avoiding loss of significant work project.

The administrative aspects of associating and disassociating resources are typically governed by project controllers working through the architecture 110. In that respect, the architecture 110 may present a project control interface through which the project controller identify the resources selected for a project and create underlying accounts and attach them to tools (e.g., a cloud storage account for source code). The project control interface also controls whether any given resource is linked to the underlying account or unlinked from the underlying account, and thus whether that resource does or does not have tokenized access. When, for instance, a resource leaves the project, the project control interface unlinks that resource from the underlying account, which disallows the resource to access the underlying account and the data stored there.

Figure 7:
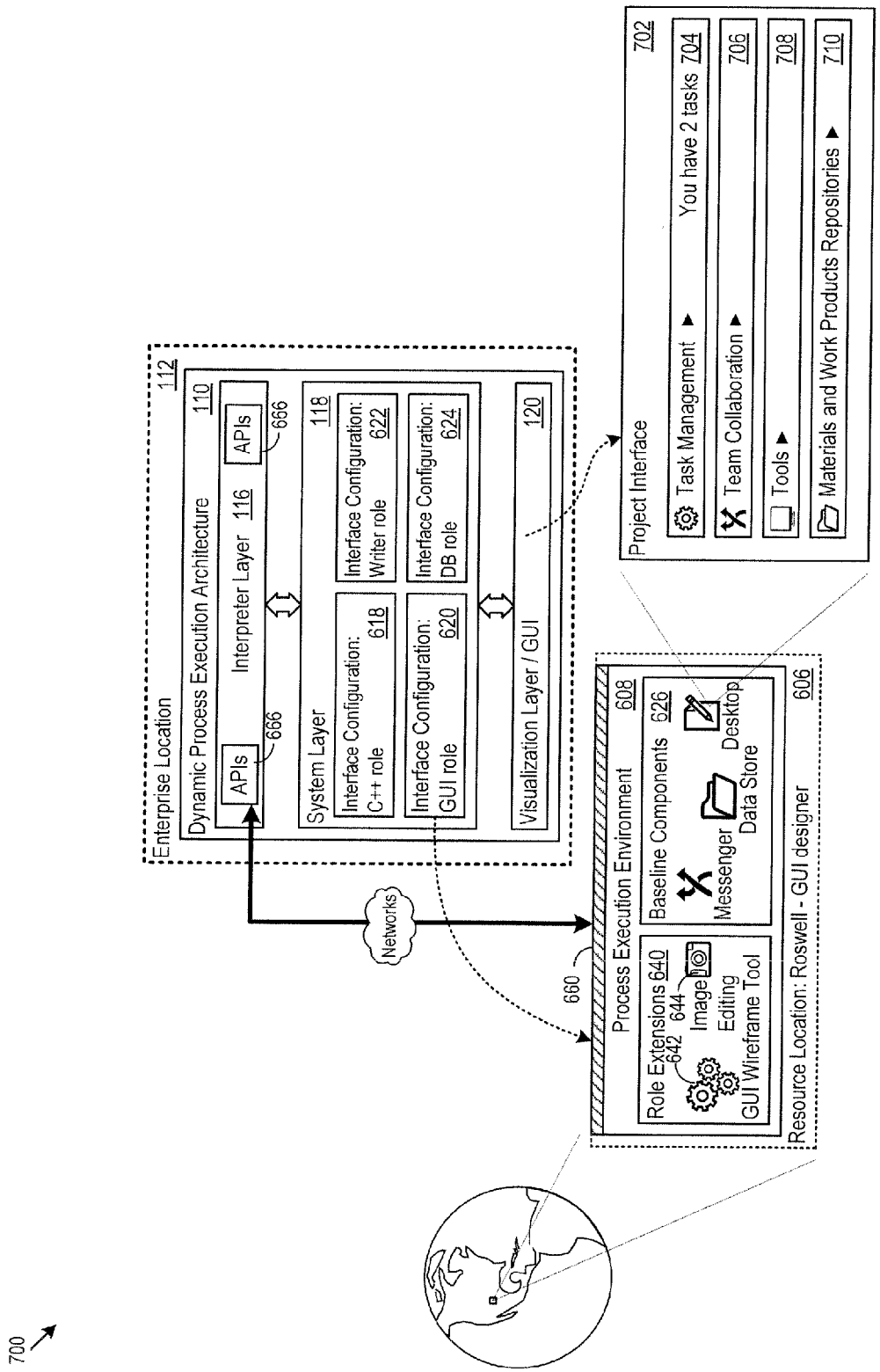
FIG. 7 shows one example of a project interface.

As noted above, the system layer 118 acts as a central controller for a complex project. In that role, the system layer 118 communicates with the visualization layer 120 to define and deliver to each resource a project interface. FIG. 7 shows one example of a project interface 702, described for the purposes of illustration with respect to the GUI resource 606. In FIG. 7, the project interface 702 is accessed through the desktop component of the process execution environment 608, but the interface may appear in or be accessed from other locations or channels.

In this example, the project interface 702 includes a task execution interface 704, that expands to provide a microplan interface for the GUI resource 606; a resource messaging interface 706 that expands to provide access to a messenger client; a tools interface 708 that expands to provide access to the tools provided in the process execution environment 608; and a repository interface 710, that expands to provide access to a data storage layer for project files. Additional elements of the interfaces 704-710 and functional examples are noted below.

Figure 8:
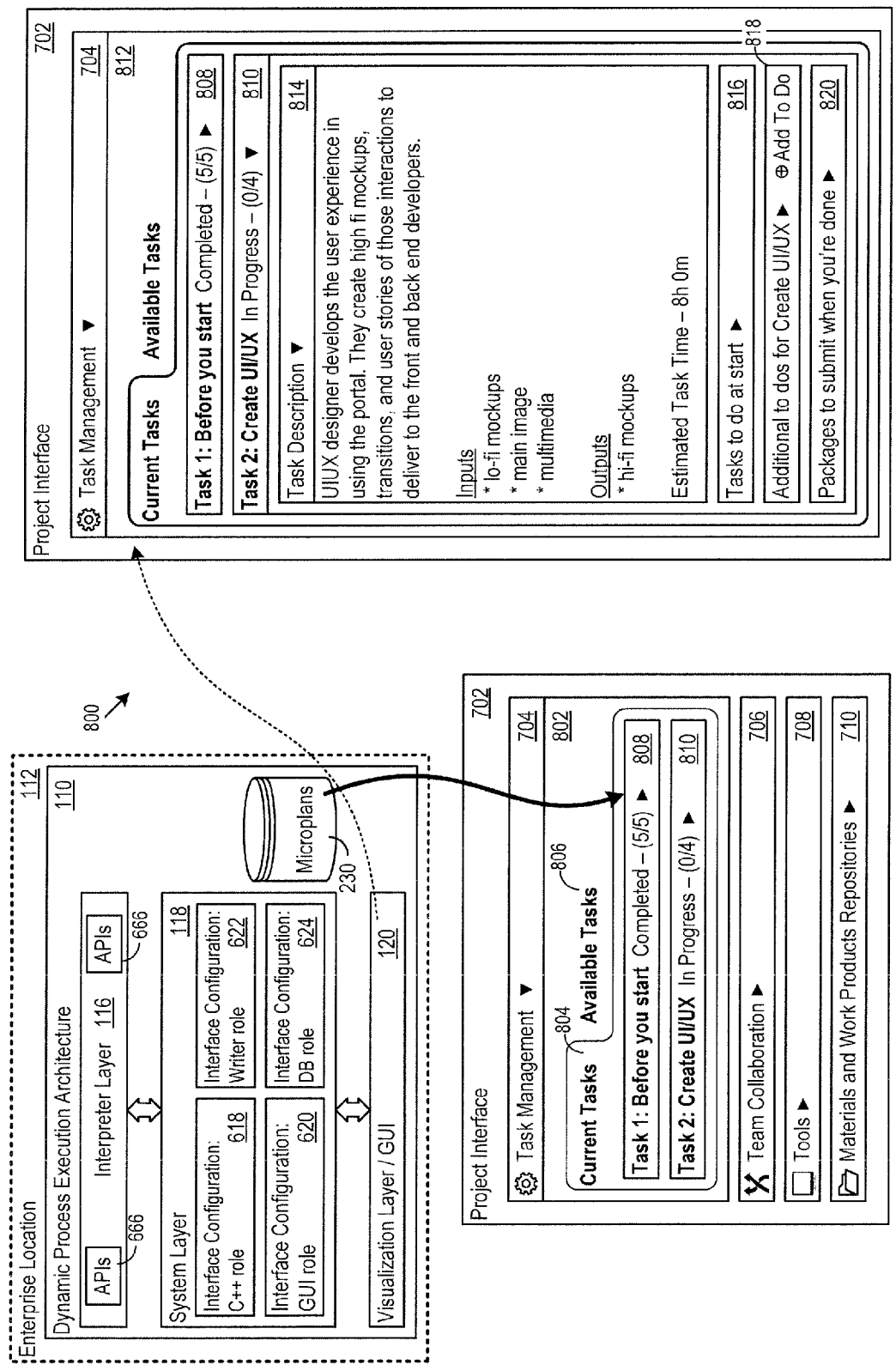
FIG. 8 shows an example microplan interfaces.

FIG. 8 shows an example microplan interfaces 800. In one implementation, microplans are step-by-step instructions for completing a task. In particular, the microplans capture granular details for how a resource should carry out the task. While microplan instructions may convey granular direction on resource-isolated tasks (e.g., save a document to a specific folder), the microplan instructions often specifically include a collaborative component instructing the resource to interact with other entities in a specific manner, e.g., send a message to a team member noting completion of work, call the project controller with an update, or save a file to a team member file location. Capturing collaborative instructions in the microplan instructions helps to ensure that the resource communicates effectively with others on the project. The architecture 110 may store microplans, including their component step-by-step instructions, in the microplan database 230, for instance. The microplans may pre-generated and marked as applicable to any pre-defined tasks, e.g., compiling source code, creating a GUI, writing an advertising brochure, or any other task.

In the example microplan interface 802, the microplan for the GUI resource 606 includes an interface tab for the current tasks 804, and an interface tab for available tasks 806 that a resource may claim. There are two current tasks 804: Task 1: Before Starting 808 and Task 2: Create UI/UX 810. The microplan interface 812 shows an example of how any task may expand to show further microplan granularity. In particular, the Task 2: Create UI/UX 810 includes several microplan components: a task description 814, that explains what the task entails; tasks to perform before starting 816, that lists the microplan instructions to complete before starting; additional task specification interface 818, that facilitates adding extra microplan instructions; and packages to submit when done 820, that (as explained further below) defines the output set for the overall task, and provides a package interface for reliably delivering the output set.

Figure 9:
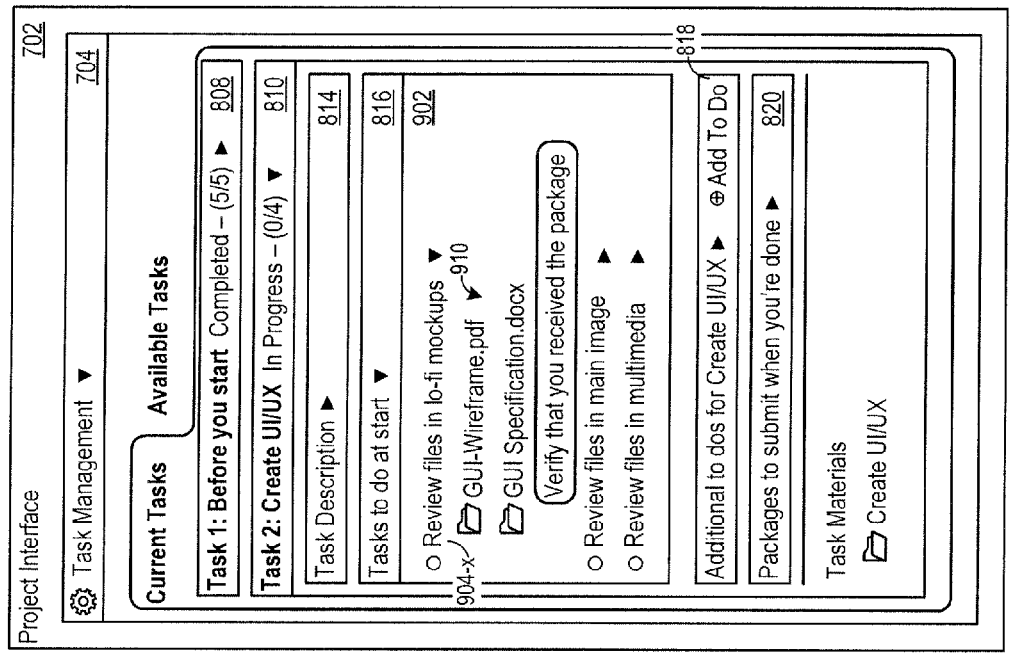
FIG. 9 provides further microplan examples.
Figure 9:
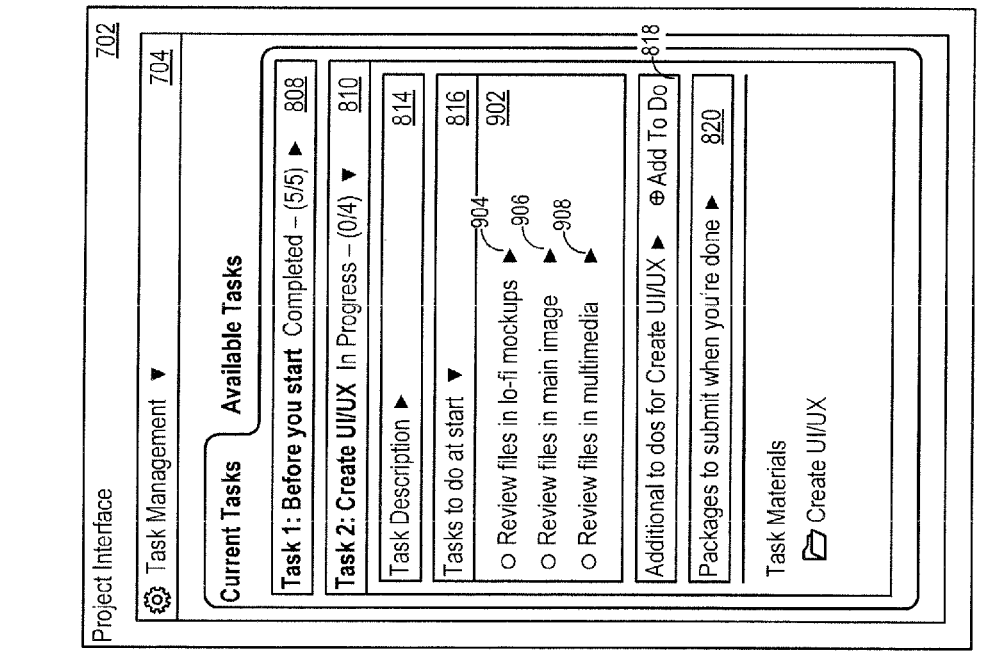

FIG. 9 provides further microplan examples 900. In FIG. 9, the tasks to perform before starting 816 expands to show granular microplan instructions 902. In this example the microplan instructions 902, include the microplan instructions 904, 906, and 908 that compose the instruction set for what to accomplish prior to starting. Each microplan instruction includes a specific directive to the resource. The microplan instruction 904, for example, directs the resource to review specific files in lo-fi form prior to starting on the GUI design. Individual microplan instructions may expand to provide further detail, as shown in the expanded instruction 904-x, which lists the specific files 910 that must be reviewed, and asks the resource to verify receipt of the package that delivered the files to the resource.

Figure 10:
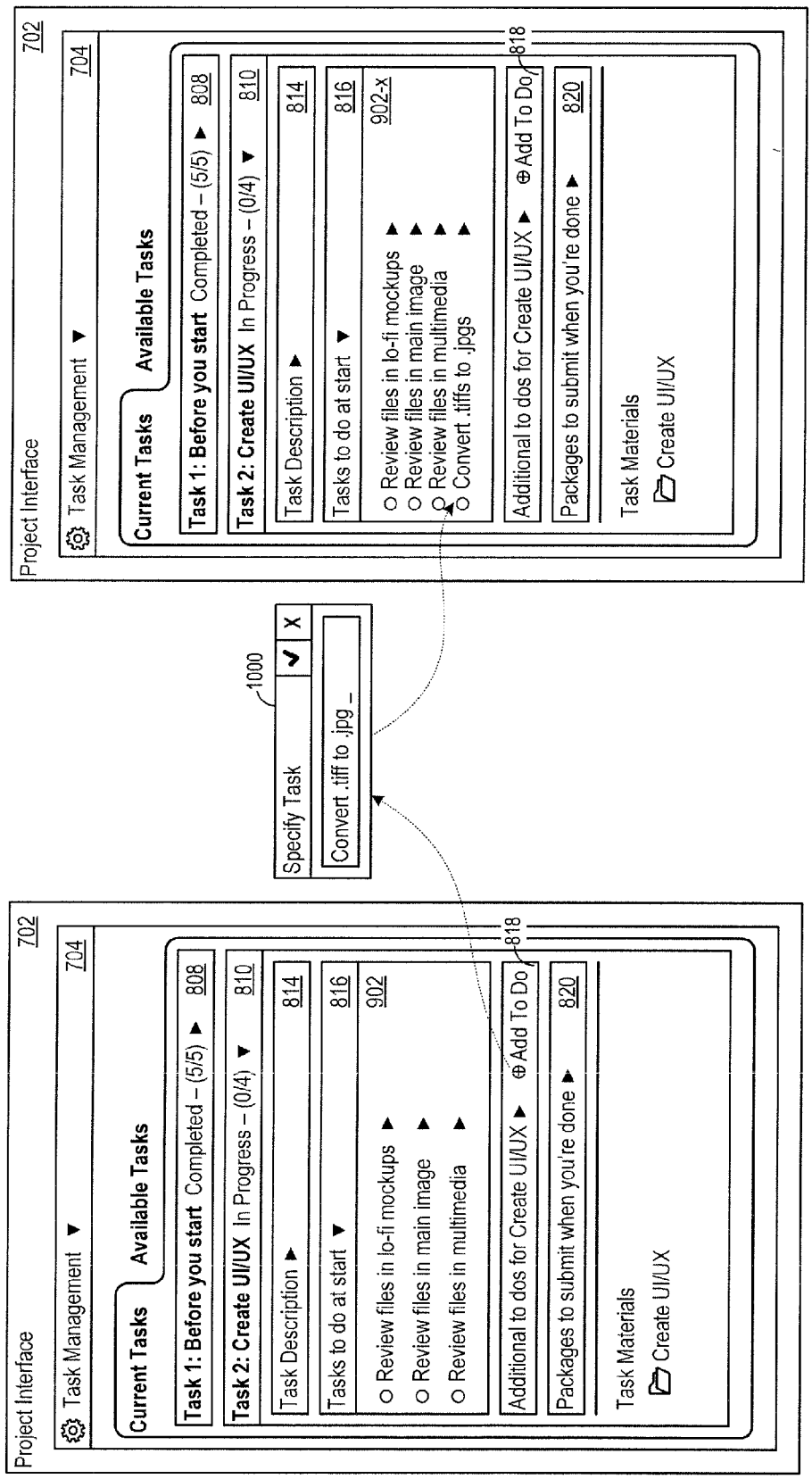
FIG. 10 shows an example of a microplan addition interface.

FIG. 10 shows an example of a microplan addition interface 1000. The microplan addition interface 1000 permits an authorized entities to add microplan instructions to any given task. In the example in FIG. 10, the additional microplan instruction directs the resource to convert file type, namely form .tiff to .jpg. The architecture 110 then adds the additional microplan instruction to the instruction set for the task, as shown in the expanded microplan instructions 902-x.

Figure 11:
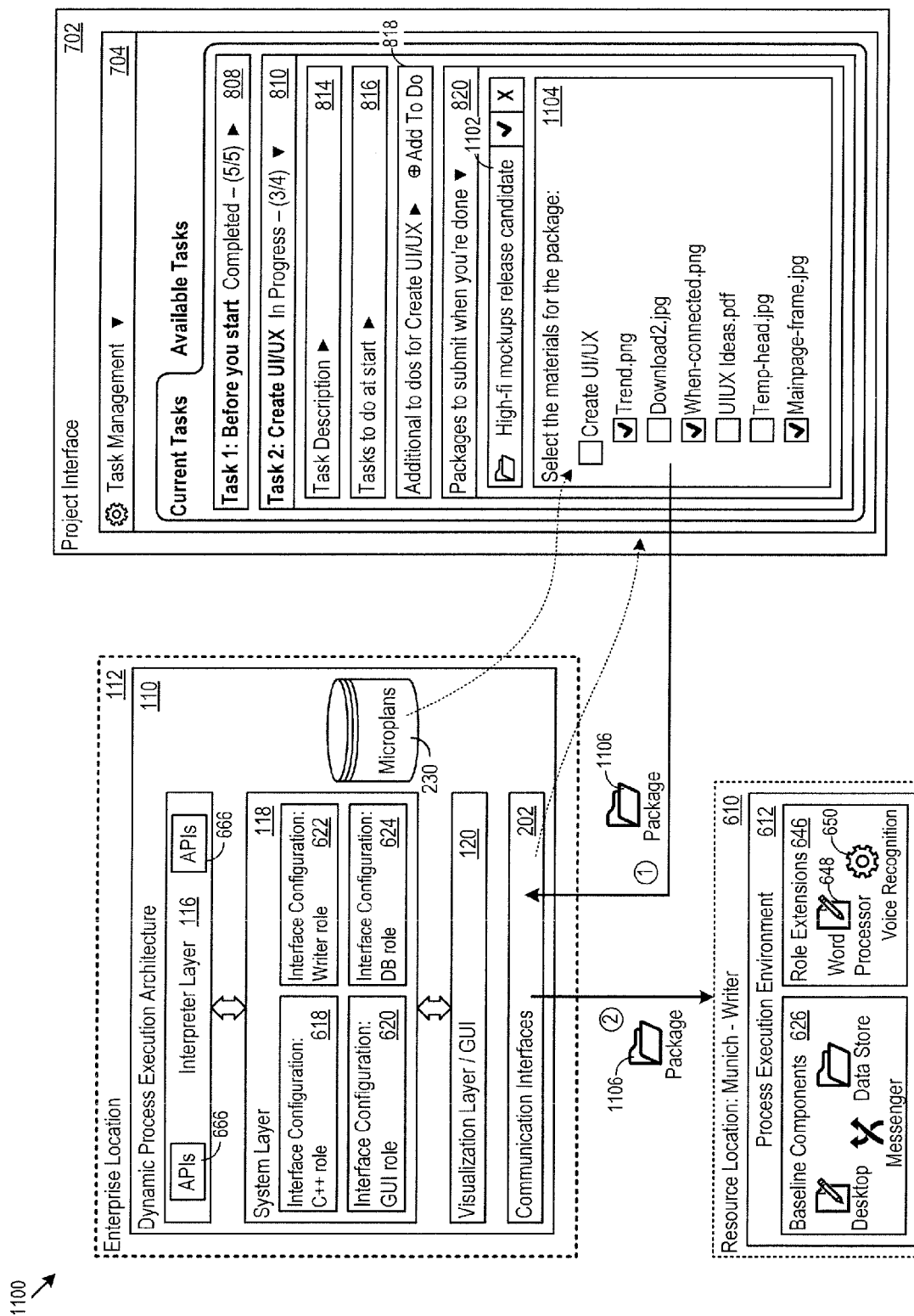
FIG. 11 shows a particular example for the GUI resource.

FIG. 11 illustrates a package handling interface 1100. When any resource has completed a task, other resources often rely on the work product. To that end, the microplan may often define an output set for a given task. The output set may be a package of files for delivery to a subsequent resource or other processing stage, for instance. As another example, the output set may also be a set of file deliverables to be packaged and sent to a project controller, client, or other entity. As such, the output set may be implemented as a list of required materials or deliverables that the resource needs to send when their task is completed.

FIG. 11 shows a particular example for the GUI resource 606. In particular, the microplan has defined an output set 1102: the GUI resource must deliver high-fi mockups for the release candidate. In support of constructing and delivering the package, the architecture 110 may generate a file browser 1104 in the desktop component. The architecture 110 may attached navigation constraints to the file browser 1104 that limit the files and folders reachable through the file browser 1104. For instance, the navigation constraints may limit navigation to the data storage layer instantiated for the GUI resource in particular, and to image files.

As shown in FIG. 11, the GUI resource 606 has selected the files for a deliverables package 1106 that meet the output set package requirements defined in the microplan. The GUI resource 606 submits the deliverables package 1106, and the architecture 110 transmits the deliverables package 1106 to one or more defined recipients, e.g., to the next resource in line in the overall project execution flow. In the example in FIG. 11, the writer resource 610 receives the deliverables package 1106 in order to begin documenting the finalized GUI features. The writer resource 610 will have its own defined output set as well, as may each resource that the architecture 110 coordinates for completion of the project as a whole.

Figure 12:
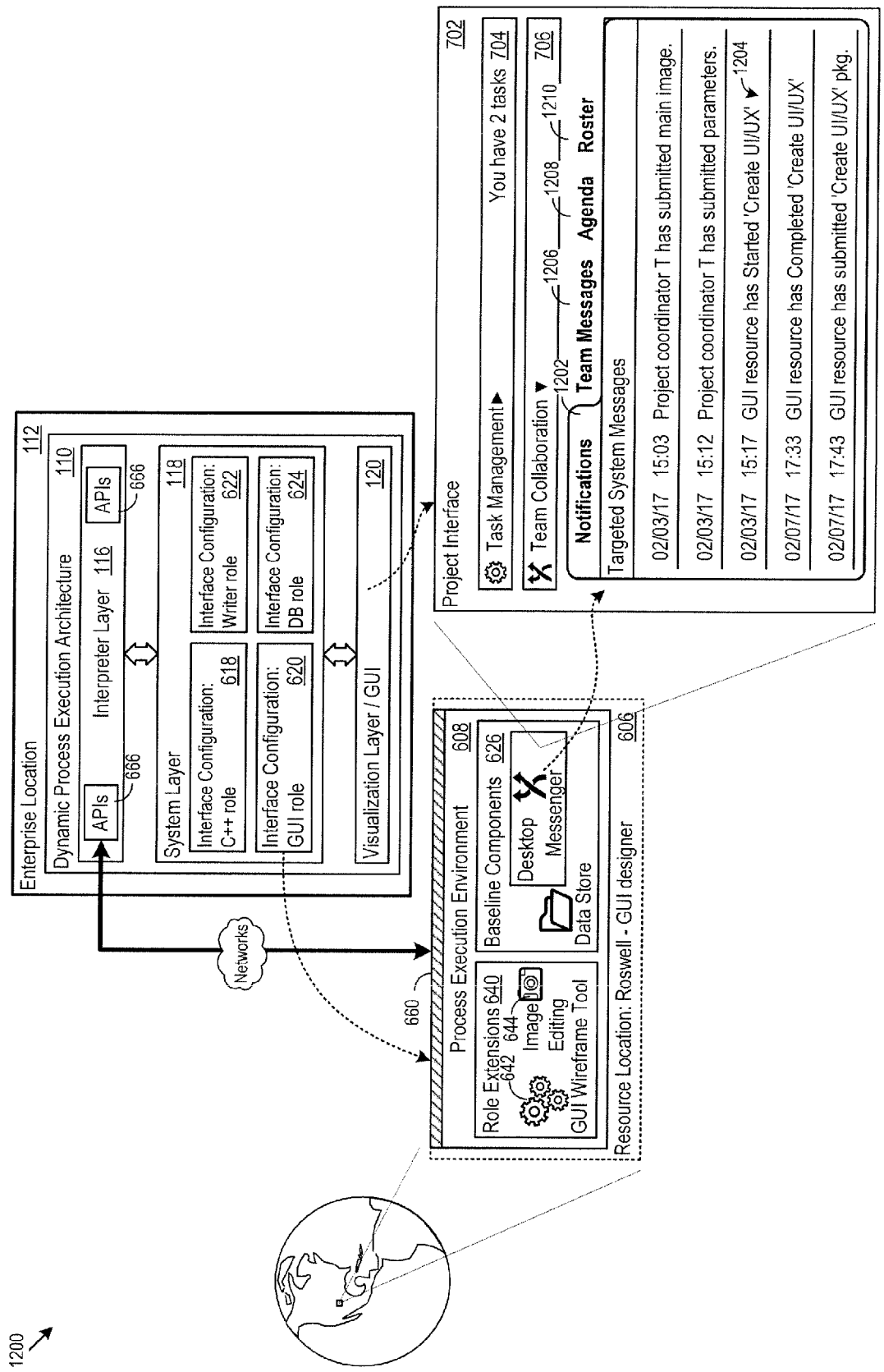
FIG. 12 shows an example messaging interface.

FIG. 12 shows an example messaging interface 1200 that may, for instance, appear in the resource messaging interface 706. The messaging interface 1200 sends, receives, displays, and categorizes communications among resources. In that regard, the architecture 110 may deliver a targeted notification panel 1202 of notification messages to specific resource targets to help limit information overload. One example of specific direction is that status messages 1204 from a given resource appear as targeted notifications specifically to resources waiting on that given resource before they can begin. For example, FIG. 12 shows targeted messages sent and received for when a resource submits a deliverables package. Another example of specific direction is that project coordinator messages may be targeted to all resources. Yet another example of targeted messaging rests upon the definition of 'nearest neighbors' of a particular resource. The architecture 110 may identify the 'nearest neighbors' of a particular resource as those other resources directly impacted by the progress of the particular resource. Having pre-defined the 'nearest neighbors', the architecture 110 may then target messages from the particular resource to the other resources that are 'nearest neighbors'. The messaging interface 1200 may provide other message interface views, such as a view of all team messages 1206, an agenda of tasks 1208, and a roster of team members 1210.

Figure 13:
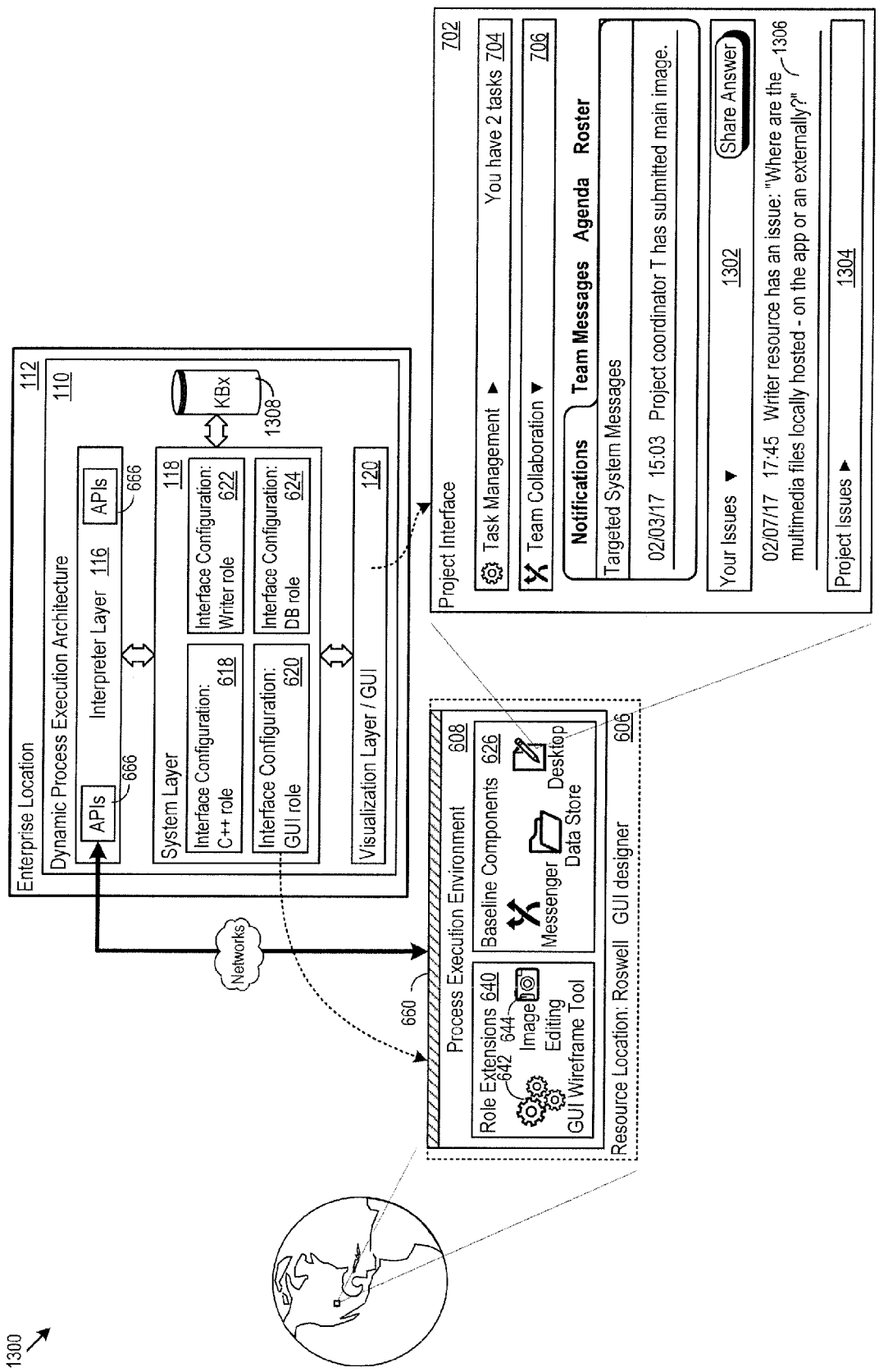
FIG. 13 shows an issue tracking interface.

FIG. 13 shows an issue tracking interface 1300 that may, for instance, appear in the resource messaging interface 706. The issue tracking interface 1300 provides issue and resolution tracking to create a searchable, exchangeable knowledge base 1308 shared among resources. In that regard, the issue tracking interface 1300 may track resource specific issues 1302 as well as project wide issues 1304, and provide a question/response communication mechanism 1306 for asking questions and capturing answers that the architecture 110 adds to the knowledge base 1308.

FIG. 14 shows logic that the architecture 110 may implement with respect to microplans and process execution environments. In one implementation, the system layer 118 establishes an interface configuration for each resource (1402), e.g., the interface configuration 618 for the C++ resource 602. Each interface configuration may include baseline components and role-specific extensions. The system layer 118 determines the structure and content of each process execution environment (1404), and directs the visualization layer 120 to render the interface for each process execution environment for each resource (1406).

The architecture 110 exposes APIs through which resources communicate with the architecture 110 (1408). Each process execution environment may have its own set of APIs, e.g., the APIs 658, 660, 662, and 664, through which the process execution environments communicate with the architecture 110.

In connection with spin-up of the process execution environments, the architecture 110 may configure any of the resources as a disassociated resource (1410). In that regard, the architecture 110 may provide (for instance) tokenized access to tool credentials, to separate ownership of the tool data from the resource itself. In that respect, the architecture 110 may present a project control interface through which the project controller identify the resources selected for a project and create underlying accounts and attach them to tools (e.g., a cloud storage account for source code). The project control interface also controls whether any given resource is linked to the underlying account or unlinked from the underlying account, and thus whether that resource does or does not have tokenized access.

The architecture 110 identifies specific microplans for project tasks (1412). The architecture 110 populates the project interface 702 with the microplan instructions (1414) that match each resource and task. During project execution, the architecture 110 also receives, categorizes, and transmits resource messages to and from targeted resources (1416).

When a resource indicates task completion, the architecture 110 generates a package submission interface (1418). As noted above, the architecture 110 may attach navigation constraints to the package submission interface. The package submission interface receives selection input from the resource of the files that meet the output set requirements (1420). The architecture 110 receives the submission package from the resource and distributes it to define recipients (1422), e.g., to another resource that requires the output set to proceed with its own task, or to a quality control entity tasked with verifying that the submission package has the correct component files.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and controlled, may be incorporated into a single memory or database, may be logically and physically organized in many different ways, and may be implemented in many different ways. In other implementations, any of the databases may be part of a single database structure, and, more generally, may be implemented logically or physically in many different ways. Each of the databases defines tables storing records that the control instructions 222 read, write, delete, and modify to perform the processing noted below. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations have been specifically described. However, many other implementations are also possible.

What is claimed is:

1. A system comprising:
   a microplan database configured to store a plurality of historical microplans previously used in prior projects, wherein each of the historical microplans are comprised of instructions for completing a task included in their respective prior project; and
   at an enterprise location:
      a communication interface operable to communicate with a resource location of a third party separate from the enterprise location;
      interpreter circuitry coupled to the communication interface; and
      system circuitry coupled to the communication interface and configured to:
         determine a resource role for the task, wherein the task is executed by a resource at the resource location;
         retrieve an interface configuration for the task, the interface configuration comprising a baseline component and a tool identifier;
         responsive to the resource role, determine a role-specific extension to the interface configuration;
         after retrieving the interface configuration and determining the role-specific extension, initiate spin-up, at the resource location, of a process execution environment comprising the baseline component and the role-specific extension and a specific tool identified by the tool identifier;

execute the interpreter circuitry to convert incoming tool-specific data elements received from the resource location to a system normalized form for use by the system circuitry, the incoming tool-specific data elements arising from execution of the specific tool at the resource location;

execute the interpreter circuitry to convert system normalized data elements needed by the specific tool to outgoing tool-specific data elements for transmission to the resource location;

generate a microplan that includes the task, the microplan generated using machine learning applied to at least some of the plurality of historical microplans stored in the microplan database that also include the task;

deliver a task execution interface comprising the microplan to the process execution environment;

receive, through the task execution interface, modification instructions for modifying the individual instructions for completing the task comprising the microplan;

modify, according to the modification instructions, the individual instructions for completing the task comprising the microplan; and store the modified microplan to the microplan database.

2. The system of claim 1, where:
the individual instructions comprise a collaboration component directing the resource to perform a specific interaction with another entity.

3. The system of claim 1, where:
the system circuitry is further configured to:
    execute the interpreter circuitry to convert system normalized data elements to outgoing tool-specific data elements for transmission to the resource location.

4. The system of claim 1, where:
the interpreter circuitry is configured to convert responsive to a schema mapping specific to the tool-specific data elements.

5. The system of claim 1, where:
the system circuitry is further configured to:
    deliver, to the process execution environment, a project interface comprising:
        a task execution interface comprising microplan instructions for executing the task; and
        a resource messaging interface comprising a target notification panel comprising notification messages targeted specifically to the resource.

6. The system of claim 1, where the system circuitry is configured to:
    generate the microplan to include a defined output set for the task, wherein the defined output set is configured for delivery to a project controller.

7. The system of claim 6, where the system circuitry is further configured to:
    deliver the defined output set to the project controller.

8. A method comprising:
at a dynamic process execution architecture hosted at an enterprise location:
    through a communication interface, establishing communication with a resource location of a third party separate from the enterprise location;
    with system circuitry:
        determining a resource role for a task executed by a resource at the resource location;
        retrieving an interface configuration for the task, the interface configuration comprising a baseline component and a tool identifier of a specific tool;
        responsive to the resource role, determining a role-specific extension to the interface configuration;
        after retrieving the interface configuration and determining the role-specific extension, initiating creation, at the resource location, of a process execution environment comprising the baseline component and the role-specific extension and the specific tool instantiated at the process execution environment;
        executing interpreter circuitry to convert incoming tool-specific data elements received from the resource location to a system normalized form for use by the system circuitry, the incoming tool-specific data elements resulting from execution of the specific tool at the resource location;
        executing the interpreter circuitry to convert system normalized data elements needed by the specific tool to outgoing tool-specific data elements for transmission to the resource location;
        generating a microplan that includes the task, the microplan generated using machine learning applied to at least some of a plurality of historical microplans stored in a microplan database that also include the task;
        delivering a task execution interface comprising the microplan to the process execution environment;
        receiving, through the task execution interface, modification instructions for modifying individual instructions for completing the task comprising the microplan;
        modifying, according to the modification instructions, the individual instructions for completing the task comprising the microplan; and
        storing the modified microplan to the microplan database.

9. The method of claim 8, where:
the individual instructions comprise a collaboration component directing the resource to perform a specific interaction with another entity.

10. The method of claim 8, further comprising:
executing the interpreter circuitry to convert system normalized data elements to outgoing tool-specific data elements for transmission to the resource location.

11. The method of claim 8, where converting comprises:
converting responsive to a schema mapping specific to the tool-specific data elements.

12. The method of claim 8, further comprising:
delivering, to the process execution environment, a project interface comprising:
    a task execution interface comprising microplan instructions for executing the task; and
    a resource messaging interface comprising a target notification panel comprising notification messages targeted specifically to the resource.

13. The method of claim 8, wherein generating the microplan further comprises including a defined output set for the task, wherein the defined output set is configured for delivery to a project controller.

14. The method of claim 13, further comprising:
delivering the defined output set to the project controller.

15. A system comprising:
at an enterprise location:
a communication interface operable to communicate with:
a first resource location at which a first resource will execute a first project role using a first tool; and
a second resource location at which a second resource will execute a second project role using a second tool;
interpreter circuitry coupled to the communication interface; and
system circuitry in communication with the interpreter circuitry and the communication interface, the system circuitry configured to:
responsive to the first project role, retrieve an interface configuration for the first resource, the interface configuration comprising a baseline component and a first resource role-specific extension;
responsive to the second project role, retrieve an interface configuration for the second resource, the interface configuration comprising the baseline component and a second resource role-specific extension;
initiate creation, at the first resource location, of a first process execution environment comprising the baseline component and the first resource role-specific extension; and
initiate creation, at the second resource location, of a second process execution environment comprising the baseline component and the second resource role-specific extension; and
receive an inbound tool-specific data element from the first tool and determining to send a corresponding outbound tool-specific data element to the second tool, the inbound tool-specific data element resulting from execution of the first tool at the first resource location;
generate a microplan that includes the task, the microplan generated using machine learning applied to at least some of a plurality of historical microplans stored in a microplan database that also include the task;
deliver a task execution interface comprising the microplan to the process execution environment;
receive, through the task execution interface, modification instructions for modifying individual instructions for completing the task comprising the microplan;
modify, according to the modification instructions, the individual instructions for completing the task comprising the microplan;
store the modified microplan to the microplan database; and
with the interpreter circuitry:
obtain an inbound schema mapping of the inbound tool-specific data element to a system normalized form;
convert the tool-specific data element to a system data element in system normalized form according to the inbound schema mapping;
obtain an outbound schema mapping from the system normalized form to the outbound tool-specific data element;
convert the system data element to the outbound tool-specific data element according to the outbound schema mapping; and
transmit the outbound tool-specific data element to the second tool for use by the second tool at the second resource location.

16. The system of claim 15, where:
the system circuitry is further configured to:
deliver, to the first process execution environment and the second process execution environment, a project interface comprising:
the task execution interface comprising the microplan; and
a resource messaging interface comprising a target notification panel; and
receive an indication of task completion from the first process execution environment, and in response:
provide, to the first process execution environment, a file browser operable to accept file selections of files from the first resource that constitute an output set meeting package requirements defined in the microplan;
create a deliverables package responsive to the file selections;
transmit the deliverables package to the second process execution environment for the second resource; and
issue a targeted notification message to the second resource through the resource messaging interface and target notification panel, the targeted notification message confirming transmission of the deliverables package to the second resource.

* * * * *